March 27, 1951     A. E. SCHIELKE     2,546,789
EDUCATIONAL DEVICE
Filed Feb. 24, 1948
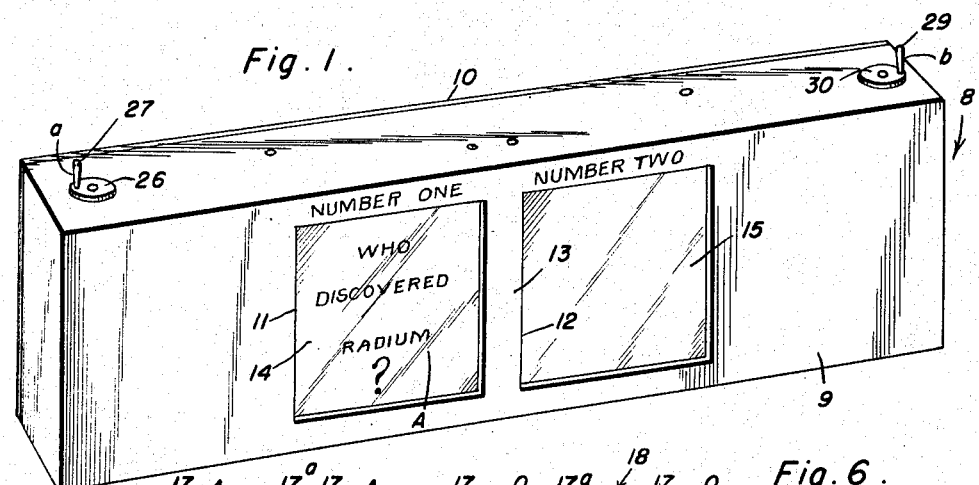
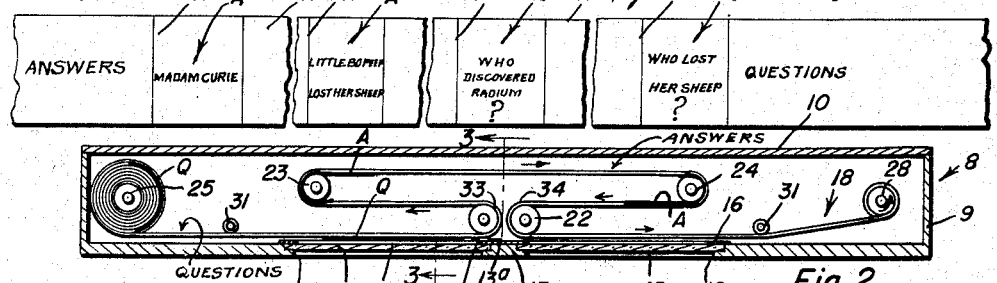
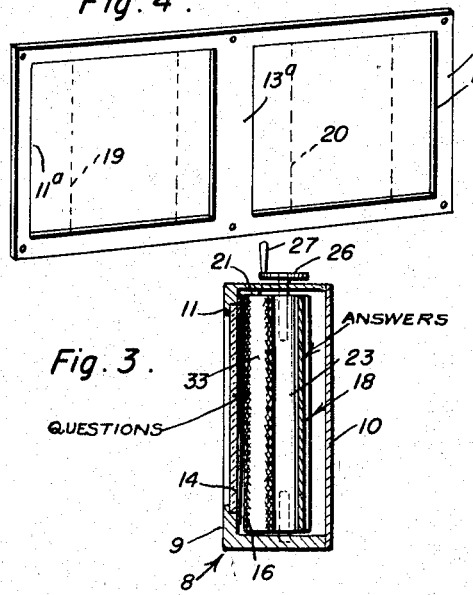
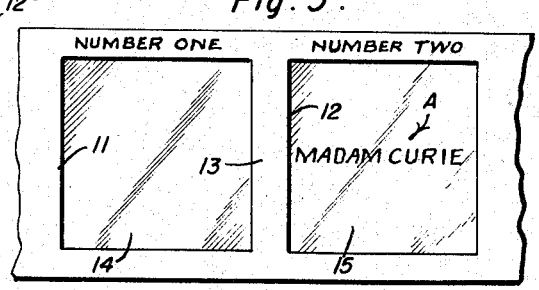
Inventor
Alfred E. Schielke
By *Clarence A. O'Brien and Harvey B. Jacobson*
Attorneys Patented Mar. 27, 1951

2,546,789

UNITED STATES PATENT OFFICE 2,546,789

EDUCATIONAL DEVICE

Alfred E. Schielke, Cranbury, N. J.

Application February 24, 1948, Serial No. 10,376

4 Claims. (Cl. 35—9)

The present invention relates to a changeable exhibitor advertising novelty which, while primarily intended for use in store windows and at similar points of public interest, is also practical and useful in the school room, home, and elsewhere in that it serves to display information of educational value and, in addition, functions in an uncanny manner which is calculated to amaze and amuse observers of an inquisitive turn of mind.

Briefly, and from a structural point of view, the invention appertains to a simple and ordinary appearing box or casing which has housed therein an ingeniously constructed and adroitly concealed mechanical movement, the latter being cleverly hidden from view, and serving to control the movements of a carefully planned band having frames of printed data, such as questions and answers, categorized picture sequences and so forth, the latter strangely appearing and disappearing in relation to windows in the front of the box, all in a manner to give out information in a unique way which intrigues and fascinates the observer, especially if he is interested in trying to ascertain what makes the device function the way it does.

More specifically, the invention has to do with a simple mystery box whose observation side has two windows provided therein, one to display a question and the other to display a proper answer to the question, the material for same being printed on a moving and roving band, and the sequence of both data being such that the leading question appears in the first window, to the left, while the answer appears, quite mysteriously and somewhat uncomprehensively, in the second window, to the right of the first window.

In carrying out the principles of this invention, I have evolved and produced a novel adaptation of well-known mechanical expedients, such as a window-equipped casing, a printed tape or band and tracking rollers for the latter. These are arranged so that by threading the band over the rollers in a novel manner and printing the data or indicia on the band according to mathematical and other spacing requirements, the unobvious and unexpected results wanted are satisfactorily achieved.

Further, in reducing to practice a practical embodiment of the instant invention, I utilize structural means of the aforementioned type wherein a predetermined arrangement of cleverly hidden band-guiding rollers coact with two windows in the front of the box in a manner that portions of the moving band register with the windows in a way which tends to provoke interest and engenders curiosity as to how said band, though it always appears to be moving from left to right, could be rigged up to pose the question in window number one and to next display the answer in window number two, whereby to thus provide a novelty which is an "attention getter" and therefore a highly useful contrivance in that it thus constitutes a worthwhile advertising medium.

Another purpose and objective of the invention has to do with a construction wherein a moving band in an enclosing box poses a problem invoking curiosity and wonderment, the solution of which is perplexing to the point of compelling a passer-by to stop, look and wonder how a printed question (or equivalent media) which comes from the left, appears in a window at the left, disappears from the same window at the right-hand end of the latter, and the correct answer seems to come from the same direction and suddenly appears at the right in another window and why and how the answer seems to be running ahead of the question instead of immediately following it and appearing in the same window, that is, the first window at the left. Ordinarily and logically presented, a single window or sight is used and the band is so constructed that it first presents the question, and as soon as the question disappears, the answer appears in one and the same window, but by contrast, in the instant situation, the question is displayed in one window which then suddenly becomes blank, and the answer is then displayed in another and separate window which was blank when the question appeared in the first window, much to the dismay of the mystified on-looker, prodding his mind as to how the answer appeared to him to have "jumped" ahead of the question, to have skipped the first window only to suddenly and strangely appear in the second window.

The principal object of the present invention, like other "puzzlers" in the same field of endeavor, is to present entertaining information, taken from different categories, then disillusion and thus capture and retain attention and interest in a manner which befuddles and perplexes the onlooker until he, in a quandary, is not satisfied until he finds out how the mechanical movement of the interior of the box accomplishes the aforementioned results.

It is the consensus of opinion among clever advertisers, that a contrivance whose mode of operation invokes principles having to do with optical illusions, legerdemain, and deception, are always in demand. Hence, the present inventive concept is based upon such factors. Therefore, it is another object of my invention to provide a device of unusual simplicity which relies upon the above stated basic principles for novelty and commercial appeal.

Other objects, features and advantages will become more readily apparent from the following description of the accompanying illustrative drawings.

In the drawings, wherein like numerals are employed to designate like parts throughout the views:

Figure 1 is a perspective view of a novelty advertising device constructed in accordance with the principles of the present invention showing or viewing a question, on the band, appearing in window number one while the window number two is blank;

Figure 2 is a longitudinal sectional view with most of the parts on the interior in elevation;

Figure 3 is a section taken transversely and vertically on the line 3—3 of Figure 2;

Figure 4 is a perspective view of a masking frame;

Figure 5 is a fragmentary front view of the central portion of the box seen in Figure 1, showing a second phase of operation in which the window at the left is blank and the answer to the question appears in the second or window to the right; and, Figure 6 is a fragmentary elevational view showing the band with printed frames presenting example questions, answers, and the like.

Referring now to the drawings by distinguishing reference numerals, the numeral 8 designates what may be conveniently described as a box or casing. The body portion 9 is rectangular and includes top, bottom, end, back, and front walls. The back wall 10 is removable to permit access to be had to the mechanical movement or mechanism on the interior. The front wall is provided with a sight opening to the left of the center which is denoted by the numeral 11 and is further provided to the right of the center with a corresponding sight opening 12, the portion therebetween, constituting a parting strip, as at 13. These openings are provided with transparent glass window panels 14 and 15. For convenience of description and orderly understanding of same, the window 14 to the left will be hereinafter referred to as the number one window; while, the window 15 to the right will be designated as the number two window. On the interior of the front wall I provide a masking frame of suitable material which is denoted by the numeral 16. This has sight openings 11a and 12a which correspond with the sight openings 11 and 12. Then, in addition, there is a parting strip 13a in line with the parting strip 13. The idea in using a masking frame in addition to the sight openings and window panes is to be able to regulate the size or area of the apertures or sights 11a and 12a corresponding to the size of the frames 17 which are laid out or otherwise printed on the movable display band or tape 18. Naturally, my invention will be in different sizes and for that reason the band will be of one length in a small box, and considerably longer in a larger box, and this would mean having more or less frames and frames of varying sizes on the different types of bands. By using masking frames the apertures 11a and 12a may be of the size shown in Figure 4, or of a smaller size as shown in dotted lines at 19 and 20. Or to put it otherwise, the use of a masking frame constitutes a handy ways and means of matching the sizes of the sights seen through the windows to the sizes of the frames on the band.

Referring further to the band, it will be understood that the printed data provided in the individual frames will, of course, vary. That is to say, I contemplate the use of interchangeable bands and as a general rule the subject matter on a particular band will be in a related category. For example, I would have one band of the "question and answer" type, a second band embodying "chronological type cartoons" without captions, another band with cartoons and explanatory captions, and a further band displaying "before" and "after" sequences.

It is apparent then that this novelty displaying device will feature interchangeable replaceable bands with a series of frames on each falling into one of the four categories listed above. In other words, the frame on each band would consist of either all questions and answers or all cartoons, etc. The size of the finished device may vary from pocket size to as large as desired.

Dismissing the problem of a choice of subject matter to be printed in the frames on the band, I would say that fundamentally the band embodies frames with suitable data displayed in each frame, and intervening frames between the printed frames which are blank. Thus, there are alternate printed and blank frames and the blank spaces between the printed frames are, generally speaking, twice the size or area of the latter.

The mechanical movement on the interior of the box is based upon an arrangement of idling rollers, which may vary in number and positions, but which are basically and fundamentally the same in so far as operational performance is concerned. Thus, I provide the two primary rollers 21 and 22 and these are located in spaced relation to each other in parallelism and situated out of sight, that is, behind the parting strips 13 and 13a. There are two additional idling rollers 23 and 24 and these are mounted in the box at predetermined distances from each other. The distances will have to be determined and measurably proportioned by the manufacturer depending on the size of the band 18 and other calculations which will have to be timed and worked out with precision to make sure that the blank areas 17a and printed areas 17 on the band appear in proper order and sequence in respect to windows number one and number two, the route traversed by the band, distances between the rollers, etc. All of the printed frames are on the same side of the band and the rollers serve to cause the band to properly track and travel in the direction of the indicating arrows in Figure 2, whereby to properly time and control the disappearing and appearing display requirements. The mathematical distance between the question Q and answer A is such that, as shown in Figure 2, the answer A comes up before window two just as the question Q is leaving window one.

The device functions by movement of the cloth or band over the rollers and may be operated either manually or electrically. The positions of the rollers shown in the drawing and the path of the cloth band over them is indicated with arrows which denote movement of said band in a forward or left direction. When the sequence, or answer, to side one is to register on side two the cloth is moved from left to right. In this manner a list of questions spaced mathematically on the cloth may appear one at a time on side one; then upon movement of the cloth toward the right the answer to each question appears on side two, the questions and answers being printed in their respective orders on the cloth band.

In the illustration shown, one end of the band is wound for unreeling, on a drum or shaft 25 having a turning disc 26 and operating crank 27. This is for rewinding the shaft after the complete story on the band has been viewed. Then, at the opposite end is a corresponding shaft 28 having a crank 29 on an operating disc 30. This is a simple hand device which moves the tape or band in a direction from left to right in order to bring the questions and answers into use. The numerals 31 on the interior of the box are merely guide rods and these are positioned to tauten and cause portions of the band to ride in flat sliding contact with the masking frame.

It is understood that in operation the question (cartoon or the like) will appear first in window number one. While thus situated, window number two is blank. Then, upon movement of the tape or band the question disappears behind the masking and in its relative position the answer appears, in an uncanny and deceptive manner, in window number two. At this stage window number one is blank. Upon further movement of the band, the answer disappears from window number two and a second question now appears in window number one. Window number two is now blank. This routine of questions and answers alternately appearing and disappearing continues until the last answer is reached, then the band must be reeled and reversed to the starting position where number one question appears in window number one again.

The gist of the invention is to falsify and give the impression that the band is endless, when moving, and actually stretches and is drawn straight across from a position behind window one to a progressing position behind window two, quite without interruption in the movement. This phenomenal illusion, made possible by concealing the separate runs of said band, makes the onlooker query himself as to how the "question" frame Q which he "actually saw" in window one shifts over from left to right and is now behind window two but has been strangely "transformed" into an "answer" frame A. Actually, however, when the trick is exposed, the frame Q turns, partly winds at 33 around roller 21, and goes back and recedes into the box and disappears, while frame A simultaneously wipes against and rounds roller 22, at 34 comes outwardly and forwardly from its hidden position in the box and sweeps to view vehind window two. Since a problem is no longer a problem, once it is understandably explained, the above tells, broadly of course, my story. Hence, a more lengthy revelation is deemed not necessary.

As stated, the band may be activated by providing a crank and roller arrangement for winding the band in either direction. Also, movement to the band may be imparted electrically. Another method would be to use a coil type spring on the roller 25. This would provide for automatic rewinding of the band back to the starting position. In commercial practice the band will have suitable starting and stopping markers (not shown) to render its use and operation substantially foolproof.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having thus described the invention, what is claimed as new is:

1. In a mystery-type changeable exhibitor of the class described, a non-transparent casing embodying a front wall, said front wall having two windows separated by a non-transparent parting strip, a masking frame having sight openings lined up with said windows, said sight openings being of predetermined sizes, a printed information band aligned for movable operation in said casing and having end portions guided into movable contact with said masking frame, said band having a printed question containing frame and a longitudinally spaced answer frame, said frames corresponding in area to each other and also corresponding in area to the areas of the sight openings in said masking frame, and means on the interior of said casing and over which the intermediate portion of said band is tracked and looped, said means defining a route of travel which is in direct proportion to the outer perimeter distances between the question and answer frames so that said frames appear in properly ordered sequence before predetermined windows.

2. The structure specified in claim 1, said means comprising a plurality of rollers over which the looped portion of the band is threaded, said rollers constituting a front pair immediately behind the masking frame and hidden by the frame, and a pair of rear rollers in the rear portion of the casing, said latter rollers being of predetermined distances from each other and from the first-named rollers, whereby to time the movement of the band so that the aforementioned question and answer frames appear and disappear in predetermined sequential order.

3. In a mystery-type changeable exhibitor of the class described, a casing, a pair of band guides mounted in vertical close spaced parallelism in the casing and at a predetermined point and defining a space between themselves, a second pair of complemental band guides, the latter being spaced from the first-named guides and also spaced from each other and all four guides serving to define a band looping route, the distance of said route being on the basis of a predetermined measurement, and a band movable in said casing and having an intermediate portion looped around said guides for purposes of traversing said route, said band having printed frames, said frames being at predetermined areas, and the distance between the trailing edge of one frame and leading edge of the other frame being approximately the same and therefore proportional to said route distance, whereby the frames travel from one to the other end of the route and start and complete the route in definite relation to each other.

4. In a mystery-type changeable exhibitor of the class described, a casing having a front wall provided with duplicate first and second windows, said windows being side-by-side and separated from each other by a non-transparent intervening parting member, a pair of rollers mounted for rotation in said casing in vertical close-spaced parallelism and defining a guide slot between themselves, said rollers being located immediately behind said parting strip and concealed from the view of an exterior observer by way of said parting member, and a second pair of complemental rear rollers also mounted for operation in said casing, said rear rollers being disposed adjacent the rear wall of the casing and being in longitudinal alignment with each other and being distances of predetermined spacing from each other and also from said first-named rollers, and a readable information band in said casing trained over said pairs of rollers and adapted for coaction with said windows, said band embodying a question frame of an area corresponding to one of said windows and further embodying a complemental answer frame of an area corresponding to the question frame, the answer frame being provided on the band in advance of and at a predetermined distance from the question frame, that portion of the band between the two stated question and answer frames embodying additional question and answer frames and further including intervening window blanking frames, all of said frames being of the same area and occurring in corresponding relative sequential orders.

ALFRED E. SCHIELKE.

REFERENCES CITED

The following references are of record in the file of this patent:

UNITED STATES PATENTS

| Number | Name | Date |
|---|---|---|
| 1,176,628 | Verville | Mar. 21, 1916 |
| 1,650,659 | Sharkey | Nov. 29, 1927 |
| 1,756,208 | Peelen | Apr. 29, 1930 |
| 1,806,160 | Graham | May 19, 1931 |
| 2,192,257 | Champion et al. | Mar. 5, 1940 |

FOREIGN PATENTS

| Number | Country | Date |
|---|---|---|
| 1,007 | Great Britain | Jan. 14, 1914 |
| 22,562 | Great Britain | Dec. 11, 1900 |